(12) United States Patent
Takahashi et al.

(10) Patent No.: US 7,290,564 B2
(45) Date of Patent: Nov. 6, 2007

(54) SOLENOID VALVE (75) Inventors: Masaji Takahashi, Tokyo (JP); Takayuki Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/541,131

(22) PCT Filed: Oct. 19, 2004

(86) PCT No.: PCT/JP2004/015431

§ 371 (c)(1), (2), (4) Date: Jun. 30, 2005

(87) PCT Pub. No.: WO2005/050075

PCT Pub. Date: Jun. 2, 2005

(65) Prior Publication Data

US 2006/0081801 A1    Apr. 20, 2006

(30) Foreign Application Priority Data

Nov. 21, 2003   (JP)   ............................. 2003-392511

(51) Int. Cl.
*F16K 11/065* (2006.01)
*F16K 31/02* (2006.01)

(52) U.S. Cl. .................... 137/625.25; 137/625.33; 251/129.15

(58) Field of Classification Search ........... 251/129.15; 137/625.25, 625.33
See application file for complete search history.

(56) References Cited

U.S. PATENT DOCUMENTS

| | | | | |
|---|---|---|---|---|
| 4,452,424 A | * | 6/1984 | Kawata | 251/129.15 |
| 4,621,788 A | * | 11/1986 | DeLew et al. | 251/120 |
| 4,941,447 A | * | 7/1990 | Mannhardt | 123/455 |
| 6,564,782 B2 | * | 5/2003 | Fujimoto et al. | 123/520 |
| 6,609,698 B1 | * | 8/2003 | Parsons et al. | 251/129.17 |
| 6,935,612 B2 | * | 8/2005 | McCombs et al. | 251/129.15 |

FOREIGN PATENT DOCUMENTS

| | | |
|---|---|---|
| DE | 21 59 453 A | 12/1971 |
| DE | 33 11 268 C1 | 9/1984 |
| DE | 38 44 453 A1 | 7/1990 |
| DE | 40 23 044 A1 | 1/1992 |
| DE | 42 44 113 A1 | 6/1994 |
| DE | 197 21 562 A1 | 11/1998 |

(Continued)

OTHER PUBLICATIONS

GPTO Office Action ; date May 24, 2006.

(Continued)

*Primary Examiner*—Gregory Huson
*Assistant Examiner*—John K. Fristoe, Jr.
(74) *Attorney, Agent, or Firm*—Surhrue Mion Pllc.

(57) ABSTRACT

A guide boss is provided in a diaphragm blocking the halfway portion of a channel; a valve disk is formed in the shape of a cylinder; the inner face of this cylinder-shaped valve disk is slidably engaged around the guide boss; and further, a valve port consisting of a plurality of long bores are formed in a diaphragm surrounding the guide boss. Thereby, fluid can responsively flow into the valve port when the valve disk is opened, and the follow-up of the fluid is accelerated.

9 Claims, 9 Drawing Sheets

FOREIGN PATENT DOCUMENTS

| | | |
|---|---|---|
| DE | 198 39 476 A1 | 3/2000 |
| DE | 198 52 980 A1 | 5/2000 |
| DE | 199 17 823 A1 | 6/2000 |
| DE | 100-37 793 A1 | 2/2002 |
| FR | 2 671 597 A1 | 7/1992 |
| GB | 8 589 66 | 1/1961 |
| GB | 2 189 010 A | 10/1987 |

OTHER PUBLICATIONS

International Search Report ; date Nov. 29, 2004.

* cited by examiner

SOLENOID VALVE

TECHNICAL FIELD

The present invention relates to a solenoid valve used for the flow rate control of fluid, and more particularly to a solenoid valve installed in piping connecting a canister, which adsorbs volatilized gas from a fuel tank, to the inlet pipe of an engine.

BACKGROUND ART

A canister adsorbing the volatilized gas and a solenoid valve are provided in halfway in piping feeding volatilized gas from a fuel tank into an engine. The output port of the solenoid valve is connected to the piping on the canister side, and the input port thereof is connected to an inlet pipe supplying fuel-air mixture into the engine, respectively. When the solenoid valve is opened, the negative pressure formed thereby in the inlet pipe aspirates the volatilized gas adsorbed in the canister, and the gas is fed into the engine.

The solenoid valve is opened and closed by energizing or de-energizing an electromagnetic coil. Energizing the electromagnetic coil generates an electromagnetic force, and a fixed iron core, which forms a magnetic circuit together with the electromagnetic coil, attracts a moving iron core, thereby opening the valve. In the housing of the solenoid valve are provided the input port and the output port, and in a channel connecting the input port to the output port is provided an opening and closing valve.

This opening and closing valve consists of a valve port provided in a diaphragm blocking the channel and a valve disk that can open and close the valve port. The valve disk is arranged to be driven by the moving iron core, for example, by making the valve disk itself of the moving iron core, and further, the disk is slidably engaged on the inner face of a guide cylinder standing up from the periphery of the valve port. The valve port which the valve disk freely moves toward or away from is made commonly in the form of a single round hole.

JP 2-221669 A disclosing a related technology describes that a valve opening is embodied as an annular gap coaxial to an electromagnet; the annular gap is coaxially surrounded by a ring-shaped double valve-seat on the inside and outside; and a valve element is embodied as an annular disk; thereby attaining the requisite flow cross section.

Moreover, JP 4-307186 A discloses a switching valve that is arranged such that a shutoff valve has a first closing body cooperating with a first valve seat; this first valve seat is embodied on a second closing body having a passage; the second closing body engages a second valve seat attached firmly to a casing by an action of a second spring; the preload force of this spring is greater than the valve-closing force exerted by a magnetic armature upon the first closing body in the opposite direction from this preload force; and the second closing body and the second valve seat form a pressure limiting valve disposed in the casing of the shutoff valve.

Further, JP 2000-170948 A discloses a fuel evaporative gas emission suppressing device, which is arranged such that in a solenoid valve having an input port to which pressure is supplied, an output port connected to an external device, and a plunger opening and closing a channel connecting the input port with the output port according to energizing and non-energizing a coil; a chamber is provided in the channel extending from the output port to an opening and closing part driven by the plunger.

Furthermore, JP 2003-148646 A discloses a solenoid valve including an electromagnetic coil generating electromagnetic force by energizing thereof, a stator iron core forming a magnetic circuit with the electromagnetic coil generating electromagnetic force, and a movable element; and being opened and closed by the contact and separation of the movable element to and from a valve seat; the stator iron core including an outside stator iron core formed on the outside of the electromagnetic coil and an inside stator iron core, which is formed on the inside of the electromagnetic coil, and which is located in the axial direction of the movable element; and the electromagnetic coil being covered with the outside stator iron core and at least part of the inside stator iron core.

The conventional solenoid valve is arranged as mentioned above. Consequently, in order to ensure a high flow rate, it had only to increase the opening space of the valve disk opening and closing the valve port made in the form of a single round hole. The opening space of the valve disk is roughly determined by the product of the peripheral length of the valve port multiplied into the lift of the valve disk. Therefore, first, increasing the lift of the valve disk is seemingly useful to make the opening space large. However, this results in the reduced lifetime of the valve disk and the increased operation sound.

Then, the increase of the peripheral length of the valve port is then thought to be utilized. However, when the peripheral length of the valve port is increased, the space on which pressure is exerted by the negative pressure formed at the time of valve closing increases. Accordingly, the electromagnetic attraction at the time of valve opening must be increased according to this space increase. This results in the reduced lifetime of the valve disk, the increased operation sound, and the enlarged housing.

Moreover, because the conventional solenoid valve is arranged such that the valve disk is slidably engaged on the inner face of the guide cylinder standing up from the periphery of the valve port, it has been difficult to reduce the weight of the solenoid valve.

The present invention has been made with the aim of solving the above-mentioned problems. An object of the present invention is to provide a solenoid valve by which the high flow rate can be ensured without increasing the lift of its valve disk and the electromagnetic attraction thereof, and the weight of the valve disk of which can be reduced.

DISCLOSURE OF THE INVENTION

The solenoid valve according to the present invention is arranged such that the pressure of fluid can act thereon from the direction lateral to its valve port, due to the fact that the valve port consists of a plurality of through holes annularly disposed in a diaphragm blocking the halfway portion of a channel; either one or both of an input port and an output port are disposed so that either one or both of the axes of the input port and the output port are intersected by the valve stem of a valve disk; and either one or both of the input port and the output port are disposed laterally to the valve port.

Because the valve port is thereby annularly disposed in the diaphragm blocking the halfway portion of the channel, the receiving pressure acting on the valve disk can be reduced, and the flow rate brought about by the solenoid valve can be increased without increasing the electromagnetic attraction required for displacing the valve disk. Further, either one or both of the input port and the output port are disposed laterally to the valve port, thereby enabling the pressure of the fluid to act on the valve from the direction lateral to the valve port. As a result, the fluid can responsively flow into the valve port at the time of valve-disk opening, and accordingly, the follow-up of the fluid is accelerated at the time of valve opening.

The solenoid valve according to the present invention is characterized in that a guide boss is provided in a diaphragm blocking the halfway portion of a channel; a valve disk is formed in the shape of a cylinder, and the inner face of this cylinder-shaped valve disk is engaged slidably around the guide boss; and further, a valve port is provided in the portion of the diaphragm, located about the periphery of the guide boss.

Thereby, the weight reduction of its valve disk can be achieved, and the valve disk does not easily incline even if a difference in pressure arises in the periphery of the valve disk.

The solenoid valve according to the present invention includes: a housing capable of being divided into two bodies, which contains an electromagnetic coil, a fixed iron core, a valve port, and a valve disk; and the solenoid valve is further characterized in that the valve port consists of a plurality of through holes annularly disposed in a diaphragm blocking up the halfway portion of a channel; the channel is provided in the one housing divided body, and is equipped with the valve port; and the other housing divided body is equipped with the electromagnetic coil, the fixed iron core, and the valve disk consisting of a moving iron core.

Thereby, the fluid does not flow through the other divided body, enabling the sealing property thereof to be improved.

BEST MODE FOR CARRYING OUT THE INVENTION

Embodiments of the present invention will now be described with reference to the drawings in order to make description in further detail of the present invention.

FIRST EMBODIMENT

Figure 1:
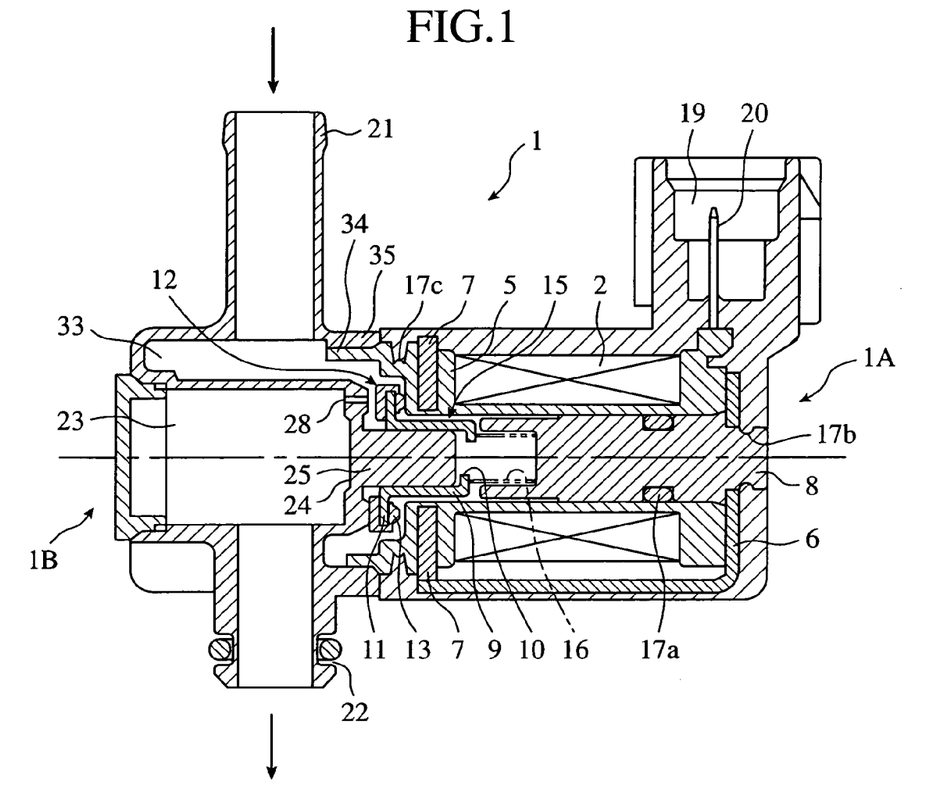
FIG. 1 is a cross sectional view showing a first embodiment of a solenoid valve according to the present invention, the upper half showing the valve-opening state, and the lower one showing the valve-closing state, respectively.
Figure 2:
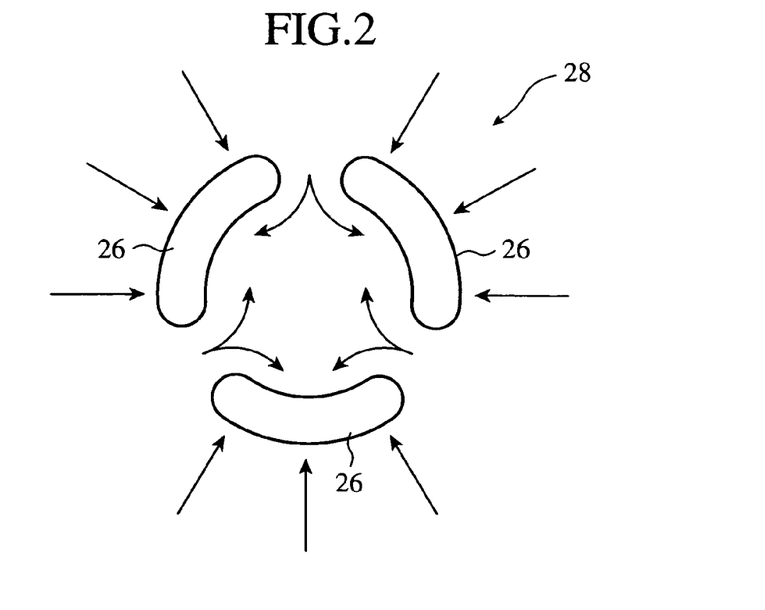
FIG. 2 is a schematic plan view showing the shape of the valve port of the solenoid valve according to the present invention.
Figure 3:
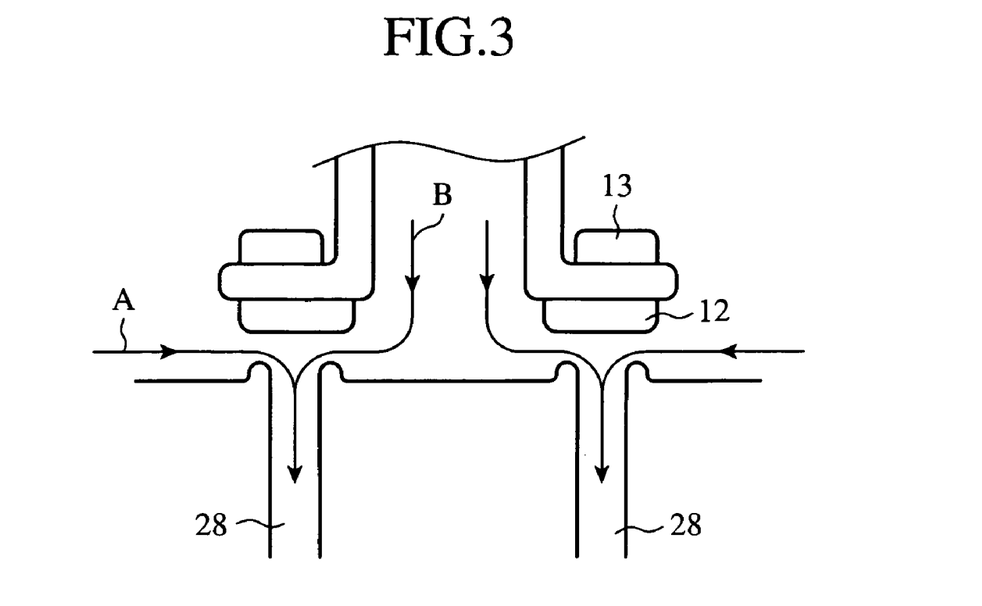
FIG. 3 is a schematic cross sectional view showing the state in which the fluid is flowing into the valve port of the solenoid valve according to the present invention.
Figure 4:
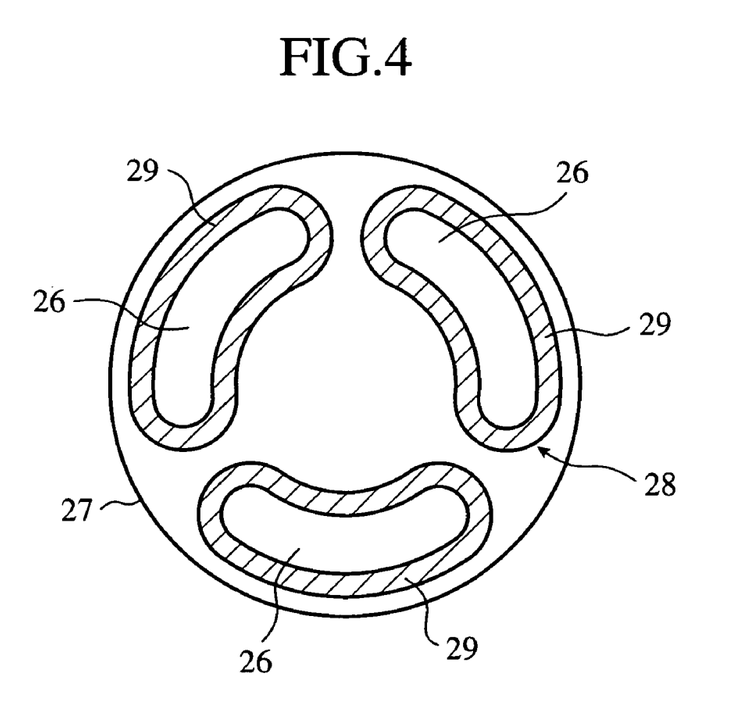
FIG. 4 is a schematic plan view showing the valve port, along which a rib is provided, of the solenoid valve according to the present invention.
Figure 5:
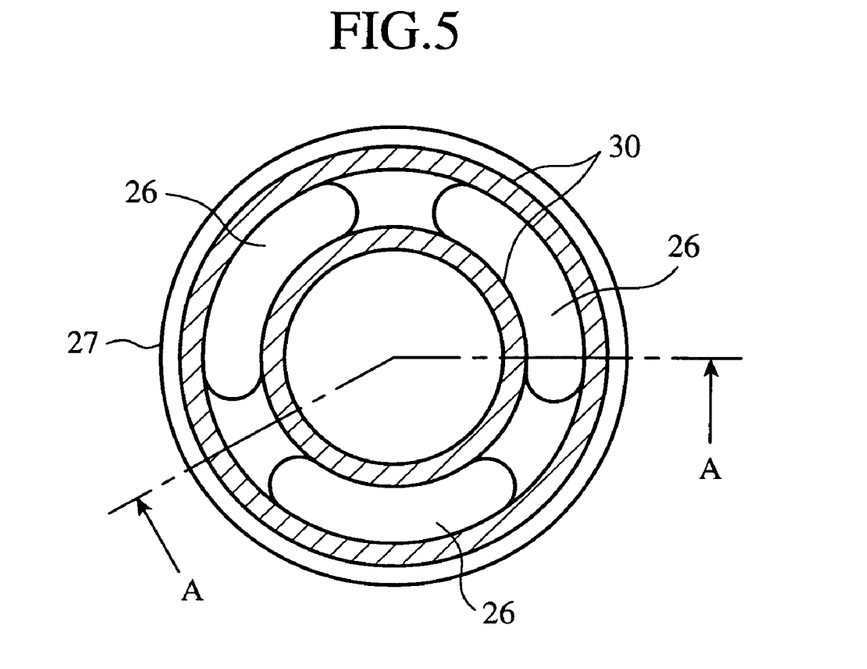
FIG. 5 is a schematic plan view showing the modification of the rib shown in FIG. 4, of the solenoid valve according to the present invention.
Figure 6:
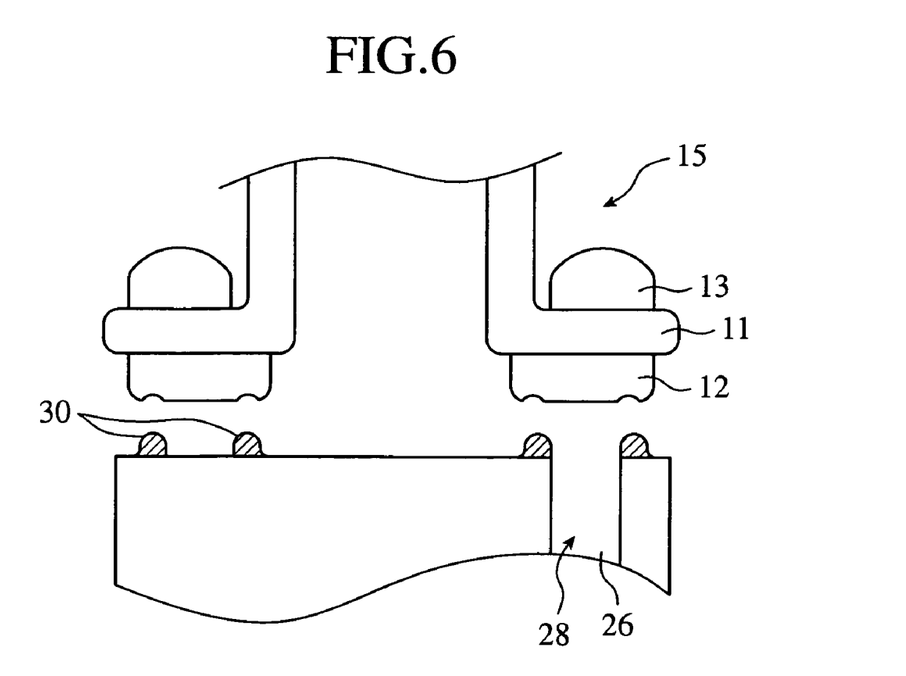
FIG. 6 is a cross sectional view taken along the line a-a in FIG. 5, of the solenoid valve according to the present invention.
Figure 7:
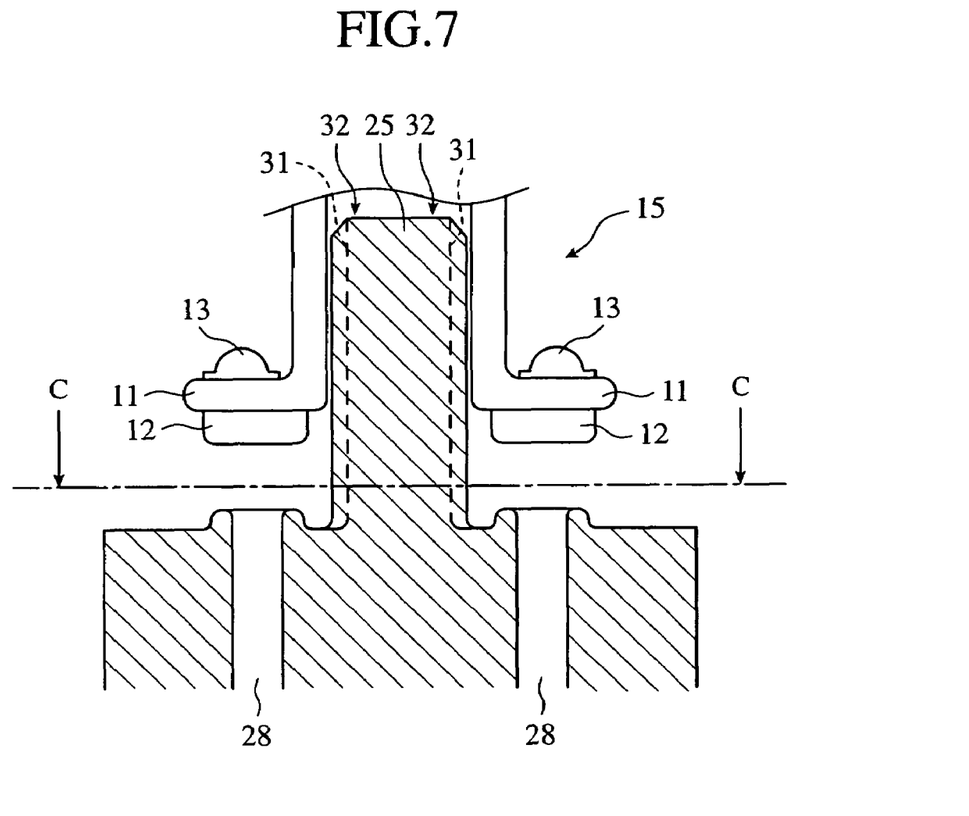
FIG. 7 is a schematic sectional view showing the state in which the valve-disk is engaged around the guide boss, of the solenoid valve according to the present invention.
Figure 8:
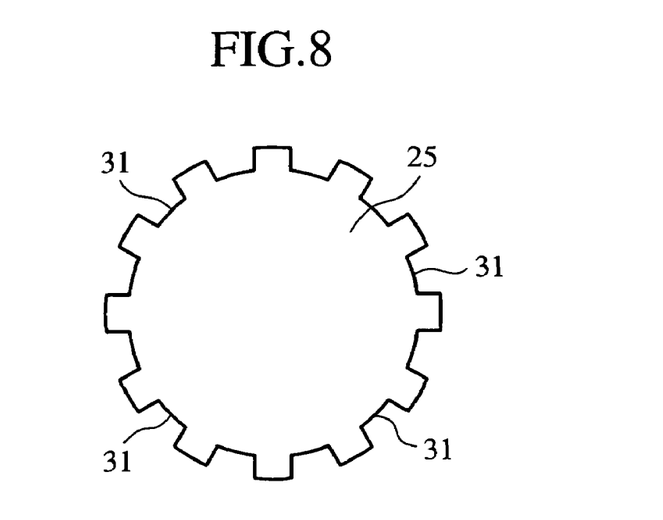
FIG. 8 is a cross sectional view showing the guide boss of the solenoid valve according to the present invention.
Figure 9:
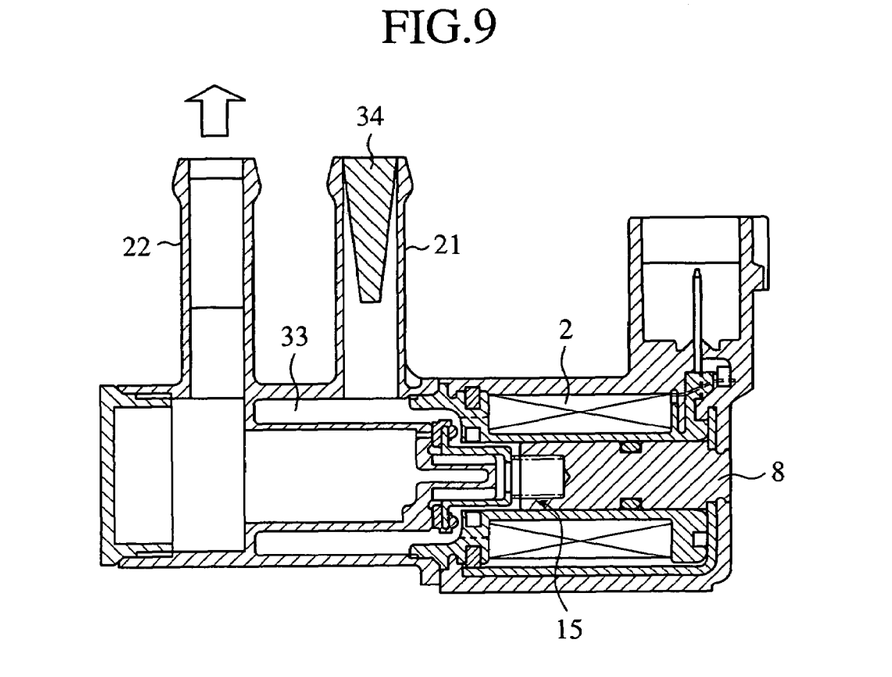
FIG. 9 is a view corresponding to FIG. 1 showing a modification of the solenoid valve according to the present invention.
Figure 10:
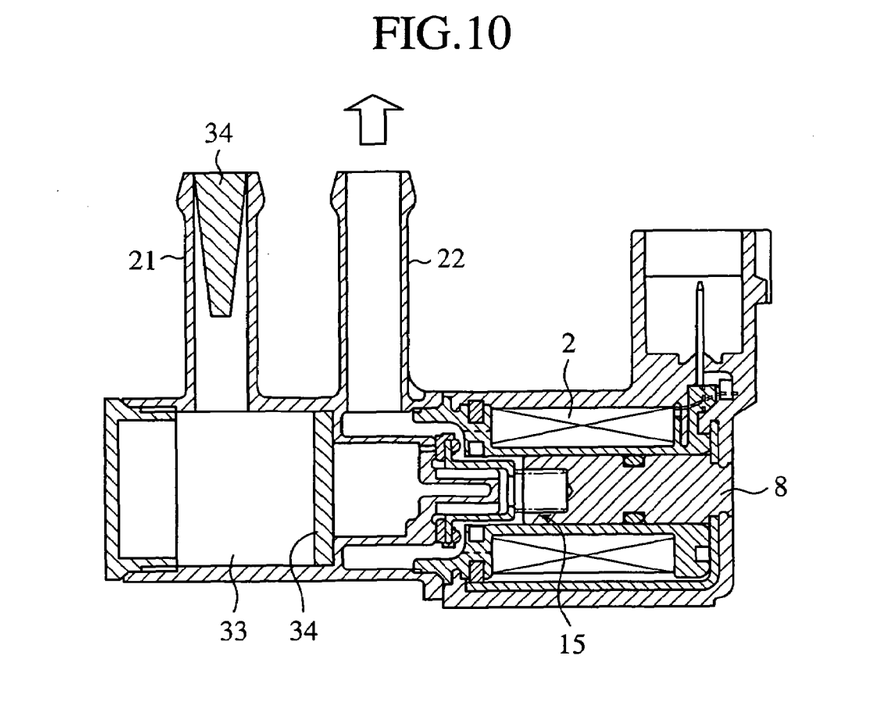
FIG. 10 is a view corresponding to FIG. 1 showing another modification of the solenoid valve according to the present invention.
Figure 11:
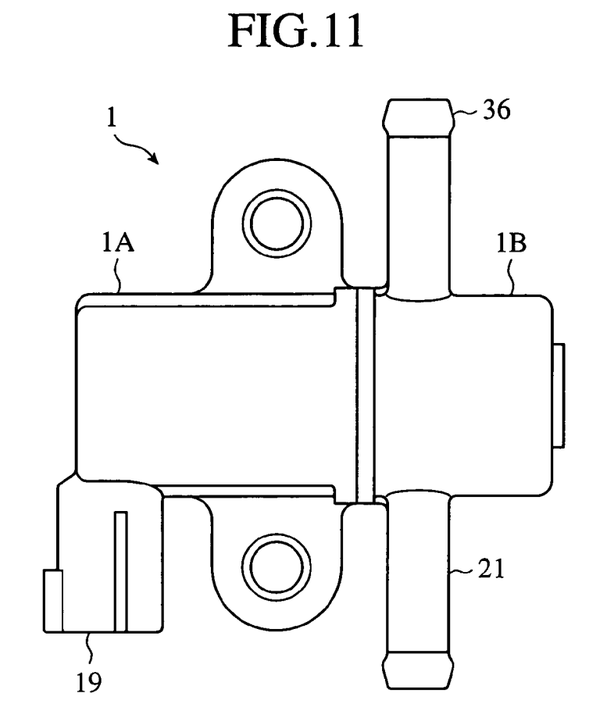
FIG. 11 is a plan view showing still another modification of the solenoid valve according to the present invention.
Figure 12:
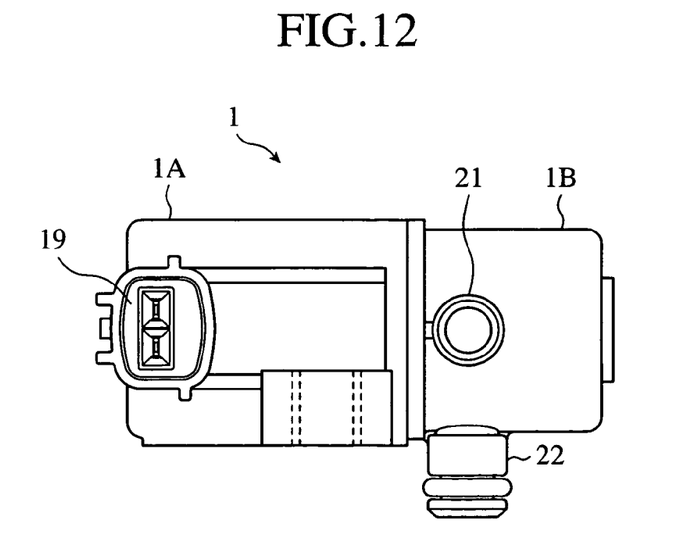
FIG. 12 is a side elevation view of the FIG. 11 modification.
Figure 13:
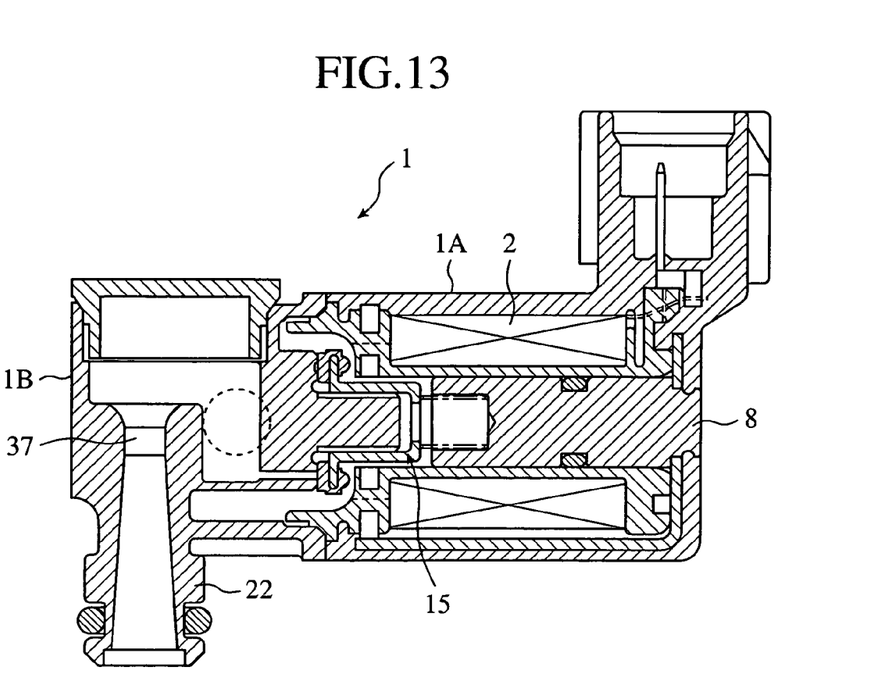
FIG. 13 is a view corresponding to FIG. 1 showing a further modification of the solenoid valve according to the present invention.
Figure 14:
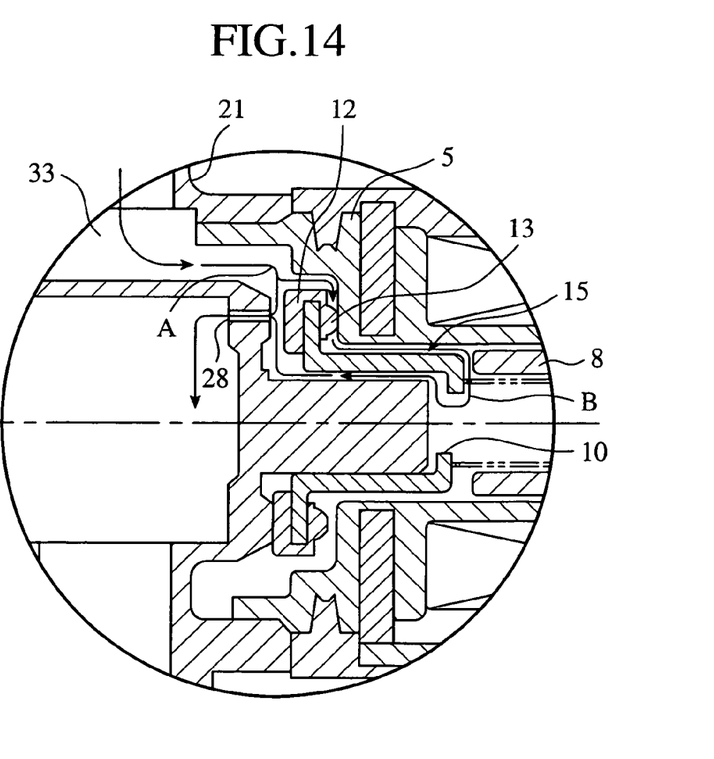
FIG. 14 is a view explaining the operation of the solenoid valve according to the present invention, the upper half showing the valve-opening state, and the lower one showing the valve-closing state, respectively.

FIG. 1 is a cross sectional view showing a solenoid valve according to the present invention, the upper half showing the valve-opening state thereof, and the lower one showing the valve-closing state thereof, respectively. FIG. 2 is a schematic plan view showing the shape of the valve port thereof. FIG. 3 is a schematic sectional view showing the state in which the fluid is flowing into the valve port thereof. FIG. 4 is a schematic plan view showing the valve port along which a rib is provided. FIG. 5 is a schematic plan view showing the modification of the rib shown in FIG. 4. FIG. 6 is a cross sectional view taken along the line a-a in FIG. 5. FIG. 7 is a schematic sectional view showing the state in which the valve disk thereof is engaged around the guide boss thereof. FIG. 8 is a cross sectional view showing the guide boss. FIG. 9 is a view corresponding to FIG. 1 showing a modification. FIG. 10 is a view corresponding to FIG. 1 showing another modification. FIG. 11 is a plan view showing still another modification. FIG. 12 is a side elevation view of the FIG. 11 modification. FIG. 13 is a corresponding view of FIG. 1 showing another modification. And FIG. 14 is a view explaining the operation thereof.

As shown in FIG. 1, the housing 1 of the solenoid valve consists of two divided bodies 1A and 1B, and the one divided body 1A contains an electromagnetic coil 2, a fixed iron core 8, and a moving iron core 9. A U-shaped yoke 6 is attached to the outside of a bobbin 5 holding the electromagnetic coil 2, and the tip of the yoke 6 is engaged and attached to a fixing plate 7 held by the bobbin 5.

At the position opposite to the fixed iron core 8 engaged in the inserting hole of the bobbin 5, is disposed the moving iron core 9 engaged slidably around the outer face of the guide boss 25 described later. The moving iron core 9 is formed in the shape of a cylinder having an axis common to that of the fixed iron core 8. In the central portion of the top wall of the fixed iron core, which forms one end face, a vent hole 10 is formed, and the other end face thereof is opened, a flange 11 being formed around the opening.

On and around the flange 11, is provided an elastic valve portion 12 formed of rubber or the equivalent, and on this elastic valve portion 12, are formed a plurality of semi-spherical stopping bumps 13. These bumps 13 are rubber-molded undetachably on the flange 11, and are provided abuttably against the bobbin 5. In addition, these moving iron core 9 and elastic valve portion 12 constitute the valve disk 15.

Between the fixed iron core 8 and the moving iron core 9, is provided a coiled spring 16 energizing the moving iron core 9 in the direction to disengage the moving iron core from the fixed iron core 8. Spaces between the fixed iron core 8 and the bobbin 5, between the fixed iron core 8 and the housing divided body 1A, and between the bobbin 5 and the divided body 1A are sealed by a first seal (O-ring) 17a, a second seal (sealant) 17b, and a third seal (sealant) 17c, respectively. The reference numeral 19 is a connector hole provided in the divided body 1A, and a terminal 20 supplying a voltage to the electromagnetic coil 2 projects into the connector hole 19.

In the other divided body 1B of the housing 1, are provided an input port 21 connected with a canister (not shown) adsorbing volatilized gas from a fuel tank and an output port 22 connected with an inlet pipe (not shown) supplying a fuel-air mixture to an engine. Preferably, of the axes of these input port 21 and output port 22, the axis of the port disposed laterally to the valve port is orthogonal to the axis of the moving iron core 9 constituting the valve disk 15.

A channel 23, which connects the input port 21 to the output port 22, is blocked up by a diaphragm 24, and in the central portion of the diaphragm 24, is provided the cylinder-shaped guide boss 25. Around the outer face of this guide boss 25, is slidably engaged the inner face of the valve disk 15. In the portion of the diaphragm 24, surrounding the guide boss 25, a plurality of (three in the shown example) through-holes 26 are formed as shown in FIG. 2 or FIG. 6.

Each of the through-holes 26 is made in the form of a long bore extending circumferentially of a concentric arc 27, which is coaxial with a circular borderline defining the periphery of the guide boss 25. These through holes 26 constitute the valve port 28 which the valve disk 15 freely moves toward or away from. Around the fringe of each of the through holes 26, a rib 29 constituting a valve seat is provided as shown in FIG. 4.

It is also possible to form the ribs with a concentric inner-and-outer double-structured annular rib 30, which is coaxial with the arc 27 as shown in FIG. 5 and FIG. 6, and to form through holes 26 between the inner and outer ribs constituting the inner-and-outer annular rib 30. In that case, the annular rib 30 is formed such that the ribs constituting the annular rib are located along the inner and outer fringes of each of the through holes 26, respectively.

Because the valve disk 15 is free to rotate around the guide boss 25, the valve disk 15 may come into sliding-contact with the rib 29 or 30 at the time of valve opening and closing while rotating. Therefore, when the rib 29 is not circumferentially continuous as shown in FIG. 4, there is the possibility that the valve disk 15 is unevenly worn. For this reason, it is preferable from the viewpoint of preventing the uneven wear thereof that the rib be constructed in the form of the inner-and-outer annular rib 30 as shown in FIG. 5.

Along the outer peripheral face of the guide boss 25, a plurality of axial longitudinal grooves 31 are lengthwise provided as shown in FIG. 7 and FIG. 8. The longitudinal grooves 31 are used for constituting a channel 32 introducing the volatilized gas, which flows into the valve disk 15 from the vent hole 10 when the valve is opened, in the direction of the valve port 28 as described later. Further, the longitudinal grooves are also effective for improving the sliding property of the valve disk 15 (preventing the sticking thereof caused by foreign matters). Accordingly, the channel 32 can be also provided not along the guide boss 25 but along the valve disk 15.

As shown in FIG. 1, in the opening portion of the input port 21, extending to the housing divided body 1B, a chamber 33 is provided. The chamber 33 attenuates the operation sounds and the fluid-flowing noises produced when the valve disk 15 is opened and closed to prevent sounds and noises from being transmitted to the canister (not shown). Moreover, the chamber is used for reducing the vibrations and the sympathetic sounds produced by the piping and the canister by means of attenuating the pulse of the fluid flowing through the piping, which connects the canister to the solenoid valve.

The housing divided bodies 1A and 1B arranged as mentioned above are bonded by engaging an engaging cylinder 35, which is extended to the bobbin 5, to the inner face of another engaging cylinder 35, which is projected into the opening portion of the divided body 1B, and then ultrasonically welding the engaged portion. In that case, the divided body 1B and the bobbin 5 are formed of the same material, nylon, for example, so that they can be welded to each other. It is conceivable that the divided bodies 1A and 1B could be bonded to each other by directly welding them not through the bobbin 5 used as described above.

However, as the material of the divided body 1A, resin such as PPS having a coefficient of linear expansion, which is near to that of the electromagnetic coil, is used in consideration of the expansion and shrinkage of the coil, caused by its heat generation. In contrast, resin materials having high toughness such as nylon or the equivalent are used for the divided body 1B because resin having low toughness such as PPS is unsuitable for the divided body 1B, which has to prevent the input and output ports from breaking off from the divided body. Thus, it is difficult to weld the divided body 1A to the divided body 1B because of their material disagreement. Therefore, forming the bobbin 5 of the same material as that of the divided body 1B enables the binding between the two bodies by means of welding.

FIG. 9 shows a modification thereof. The output port 22 is disposed adjacent and parallel to the input port 21 therein, and further, the input port 21 is equipped with a filter 34, thereby preventing an entry of foreign matters into the housing 1.

FIG. 10 shows another modification thereof. The positions of the input and output ports 22 and 21 are changed in the axial direction of the housing therein, and the position of the chamber 33 is also changed for this reason, thereby enabling the filter 34 to be placed in either of the chamber 33 or the input port 21.

FIG. 11 and FIG. 12 show still another modification thereof. They are different from the above-described valves in that the housing divided body 1B is equipped with a third resonator port 36 for reducing fluid-flowing noises.

FIG. 13 shows a further modification thereof. The axis of the output port 22 is crossed at right angles to that of the input port 21, and the output port 22 is equipped with a sonic nozzle 37 for reducing the flow-rate variation caused by the variation of the negative pressure within the inlet pipe (not shown).

The operation thereof will now be described below.

When the electromagnetic coil 2 is energized to generate an electromagnetic force, the valve disk 15 consisting of the moving iron core is attracted by the fixed iron core 8 against the energizing force of the coiled spring 16. Then, the valve portion 12 disengages from the ribs 29 or the rib 30 of the valve port 28, and the stopper bumps 13 abut on the bobbin 5. Because each of the bumps 13 is formed of an elastic body, the sound caused by the collision thereof to the bobbin 5 is reduced. Moreover, the abutment of the bumps 13 against the bobbin 5 prevents the top wall of the valve disk 15 from abutting against the fixed iron core 8, and forms a gap between the flange 11 of the valve disk 15 and the bobbin 5.

When the valve disk 15 is opened, as shown in FIG. 1 and FIG. 14, part of the fluid (A), which flowed from the input port 21, flows into the valve port 28 through the chamber 33 by the attraction caused by the negative pressure. In contrast, the other part of the fluid (B) goes through the gap between the flange 11 of the valve disk 15 and the bobbin 5, passes the groove 31 of the guide boss 25 from the vent hole 10 of the valve disk 15, and flows into the valve port 28. The fluid, which flowed into the valve port 28, is aspirated by the inlet pipe (not shown) through the output port 22.

As mentioned above, according to the first embodiment of the present invention, because the valve port is annularly disposed in the diaphragm blocking the halfway portion of the channel, the receiving pressure acting on the valve disk can be reduced, and the flow rate brought about by the solenoid valve can be increased without increasing the electromagnetic attraction required for displacing the valve disk. Further, either one or both of the input port and the output port are disposed laterally to the valve port, thereby enabling the pressure of the fluid to act thereon from the direction lateral to the valve port. As a result, when the valve disk is opened, the fluid can responsively flow into the valve port. Accordingly, the follow-up of the fluid is accelerated at the time of valve opening.

Moreover, the valve disk is formed in the shape of a cylinder so that the valve disk slidably engages the guide boss. Thereby, the weight of the valve disk can be reduced, and further, the valve disk does not easily incline even if a difference in pressure is caused in the periphery of valve disk.

In addition, because the channel is formed in the one housing divided body in which the valve port is provided, the fluid does not flow through the other divided body, thereby enabling the sealing property thereof to be improved. Additionally, the volatilized gas can be prevented from penetrating the coil portion.

Furthermore, the rib serving as the valve seat can be formed on the fringe of the valve port, and further, the rib can be made in the form of an inner-and-outer double-structured annular rib. This improves the sealing property of the valve disk. The formation of the rib in the shape of a ring can prevent the valve disk, which slidingly contacts the valve port while rotating, from being unevenly worn.

Besides, the auxiliary channel is formed between the inner peripheral face of the cylinder-shaped valve disk and the outer peripheral face of the guide boss, which increases the inflow of the fluid to the valve port, thereby increasing the flow rate brought about by the solenoid valve.

Moreover, the elastic stoppers are provided on the seating portion of the valve disk, which prevents the valve disk from abutting against the fixed iron core, and further, each of the elastic stoppers is formed in the shape of a hemisphere, which reduces the sound caused by the collision of the valve disk against the bobbin member.

Additionally, in order to weld the one housing divided body to the bobbin member used for holding the electromagnetic coil, the housing divided body and the bobbin member can be formed of the same material, which enables the welding to be easily done when welding them.

In addition, the output port is connected to the canister adsorbing the volatilized gas from the fuel tank, and the input port is connected to the inlet pipe supplying a fuel-air mixture into the engine, respectively. This enables the volatilized gas from the fuel tank to be favorably supplied into the inlet pipe.

Besides, because in the valve disk 15, the vent hole 10 is provided, the fluid can flow into the valve disk 15 from this vent hole 10 when the valve is opened, which prevents a negative pressure from being formed in the valve disk 15. Thereby, the electromagnetic attraction used for attracting the valve disk 15 can be reduced. The same holds true for the time of valve closing. Because no negative pressure is produced in the valve disk 15, the electromagnetic attraction used for opening the valve disk 15 can be reduced.

SECOND EMBODIMENT

Figure 15:
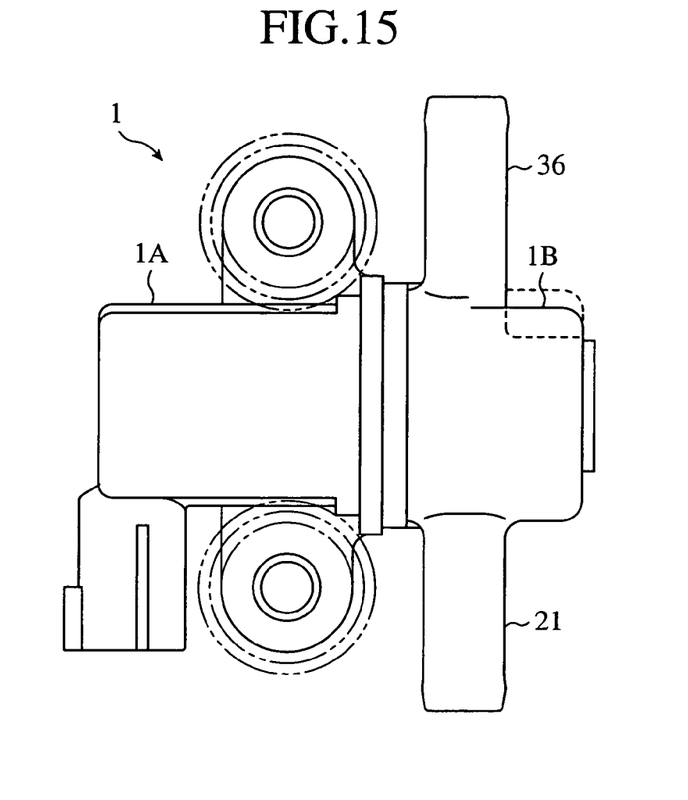
FIG. 15 is a plan view showing a second embodiment of a solenoid valve according to the present invention.
Figure 16:
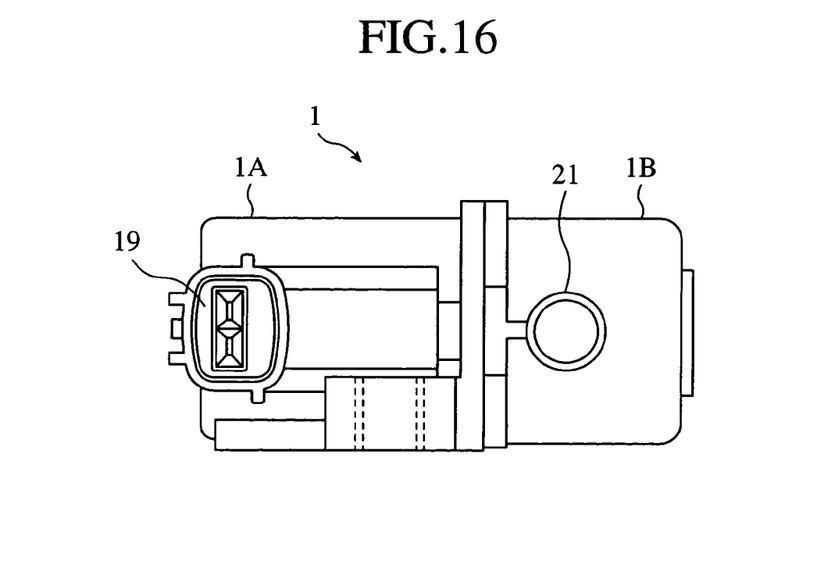
FIG. 16 is a side elevation view of the FIG. 15.
Figure 17:
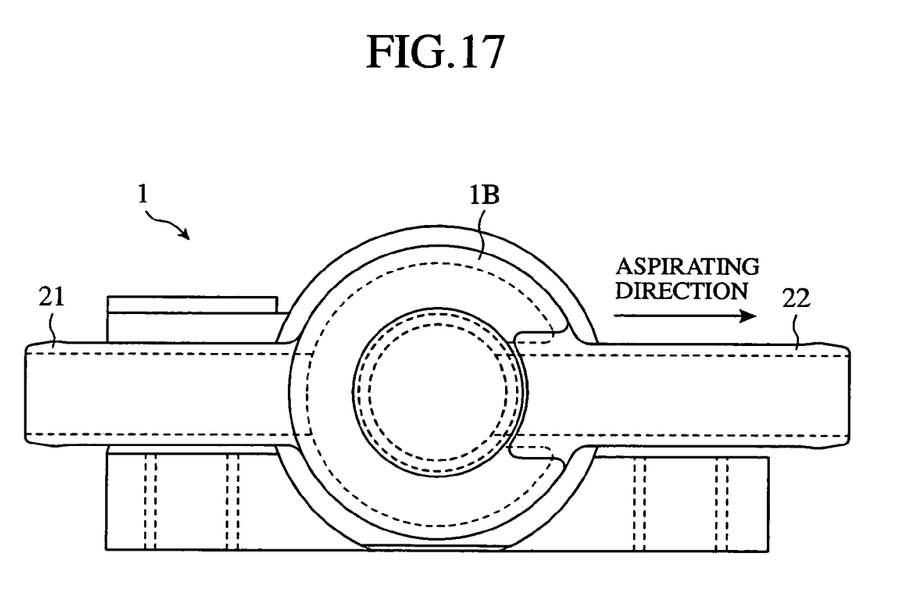
FIG. 17 is a front view of the FIG. 15.

FIG. 15 is a plan view showing the second embodiment of a solenoid valve according to the present invention. FIG. 16 is a side elevation view of the FIG. 15. And FIG. 17 is a front view of the FIG. 15. The same parts are designated by similar numerals in Embodiment 1, and the repetitive explanation is omitted for brevity's sake.

Embodiment 2 is, as shown in FIG. 17, a solenoid valve arranged such that the input port 21 and the output port 22 are disposed on a straight line. The solenoid valve can be made compact, and provide an advantageous vehicle layout.

INDUSTRIAL APPLICABILITY

As mentioned above, the solenoid valve according to the present invention is recommended for a solenoid valve in which an output port is connected to piping on the canister side, and an input port is connected to an inlet pipe, respectively, and the negative pressure developed in the inlet pipe by opening the solenoid valve supplies the volatilized gas adsorbed in a canister into an engine.

The invention claimed is:

1. A solenoid valve having an electromagnetic coil and a fixed iron core, and further including a valve disk consisting of a moving iron core, which freely moves toward or away from a valve port provided in a channel located between an input port and an output port, wherein
   the valve port consists of a plurality of through holes annularly disposed in a diaphragm blocking up the halfway portion of the channel;
   either one or both of the input port and the output port are disposed such that either one or both of the axes of the input port and the output port are intersected by an axis of the valve disk;
   either one or both of the input port and the output port are disposed laterally to the valve port; and
   an inner-and-outer double-structured annular rib serving as a valve seat is provided in the diaphragm and the valve port is provided between the inner and outer ribs constituting the inner-and-outer double-structured annular rib.

2. A solenoid valve according to claim 1, wherein the output port is connected to a canister adsorbing volatilized gas from a fuel tank, and the input port is connected to an inlet pipe supplying fuel-air mixture into an engine, respectively.

3. A solenoid valve according to claim 1, wherein the inner rib and the outer rib constituting the inner-and-outer double-structured annular rib are circumferentially continuous.

4. A solenoid valve having an electromagnetic coil and a fixed iron core, and further including a valve disk consisting of a moving iron core, which freely moves toward or away from a valve port provided in a channel located between an input port and an output port, wherein a guide boss is provided in a diaphragm blocking up the halfway portion of the channel;

the valve disk is formed in the shape of a cylinder, and the inner face of this cylinder-shaped valve disk is engaged slidably around the guide boss;

the valve port is provided in the portion of the diaphragm, located about the periphery of the guide boss; and an inner-and-outer double-structured annular rib serving as a valve seat is provided in the diaphragm and the valve port is provided between the inner and outer ribs constituting the inner-and-outer double-structured annular rib.

5. A solenoid valve according to claim 4, wherein the top wall of the cylinder-shaped valve disk is bored to form an vent hole;

an auxiliary channel is formed between the inner-peripheral face of the cylinder-shaped valve disk and the outer-peripheral face of the guide boss; and thereby, part of the fluid, which flowed from the output port, does not flow into the valve port when the valve is opened, but flows down along the periphery of the cylinder-shaped valve disk, and flows through the auxiliary channel from the vent hole; after tat the part of fluid being capable of flowing into the valve port.

6. A solenoid valve according to claim 5, wherein an elastic stopper that can abut on a bobbin member for holding the electromagnetic coil is provided in the seating portion of the valve disk, and a fluid-flowing gap leading from the output port to the periphery of the valve disk is provided between the seating portion of the valve disk and the bobbin member.

7. A solenoid valve according to claim 6, wherein the elastic stopper is formed in the shape of a hemisphere.

8. A solenoid valve having an electromagnetic coil and a fixed iron core, and further including a valve disk consisting of a moving iron core, which freely moves toward or away from a valve port provided in a channel located between an input port and an output port, wherein the valve port consists of a plurality of through holes annularly disposed in a diaphragm blocking up the halfway portion of the channel;

the channel is provided in one housing divided body of a housing that can be divided into two bodies, and is equipped with the valve port; and the other housing divided body is equipped with the electromagnetic coil, the fixed iron core, and the valve disk consisting of the moving iron core; and an inner-and-outer double-structured annular rib serving as a valve seat is provided in the diaphragm and the valve port is provided between the inner and outer ribs constituting the inner-and-outer double-structured annular rib.

9. A solenoid valve according to claim 8, wherein the material of which the one housing divided body where the channel is provided is formed is the same as the material of a bobbin member for holding the electromagnetic coil, fixed in the other housing divided body; and the one housing divided body and the bobbin member for holding the electromagnetic coil are welded to each other, thereby bonding the one housing divided body to the other housing divided body.

\* \* \* \* \*